Oct. 29, 1968  H. HURWITZ, JR  3,408,593

SCANNED LASER BEAM DEVICE

Filed April 30, 1964

Inventor:
Henry Hurwitz, Jr.,
by John P. DeLitt
His Attorney.

United States Patent Office 3,408,593
Patented Oct. 29, 1968

3,408,593
SCANNED LASER BEAM DEVICE
Henry Hurwitz, Jr., Schenectady, N.Y., assignor to General Electric Company, a corporation of New York
Filed Apr. 30, 1964, Ser. No. 363,832
11 Claims. (Cl. 331—94.5)

ABSTRACT OF THE DISCLOSURE

A scanning beam of coherent light is emitted from a laser by situating a light valve cell between a pair of polarizers along one of the reflecting ends of the laser. The polarizers are of mutually perpendicular polarization. A transmission line is disposed along the length of the cell. When an electrical pulse is transmitted along the line, the cell becomes doubly refracting in the vicinity of the pulse, thereby rotating the polarization of light received from the polarizer adjacent the laser by 90° so that the light may pass through the remaining polarizers.

---

Figure 1:
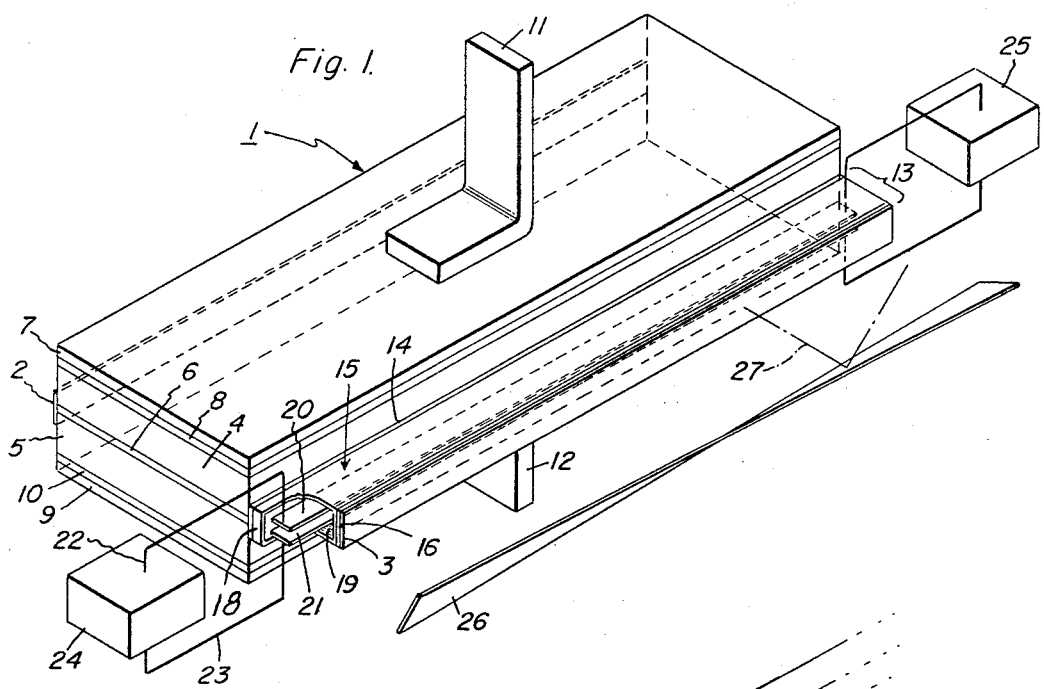

The present invention relates to a radiation scanning or deflection device and particularly to a device for providing positioned radiation of high intensity.

A laser or a light maser is a device providing output radiation of a unique character. This radiation is monochromatic, intense and also coherent. Because of the latter property, a narrow output beam of parallel radiation having very small divergence is characteristically produced. Therefore laser output radiation can be concentrated into extremely small areas where the energy density is enormous.

Laser devices operate according to the principle of stimulated coherent emission. The radiation-producing element of the laser is an element having the property of emitting radiation spontaneously under certain conditions of energy input. Energy, in the form of an electric current, or some other type of radiation, is applied as an input to this laser element, and, in addition, reflection means are located on either side of the element. These reflect the radiation, spontaneously produced in the laser element, back and forth through the element, and the reflection excites or "stimulates" further radiation in-phase with the reflected wave. The resulting radiation is said to be coherent. The reflection means, together with the laser element, form a resonant cavity in which the spontaneous radiation is cumulatively built up until a large coherent output is produced. One of the reflection means is conventionally made only partially reflecting for permitting the exit of an output beam.

The modulation of the radiation output of a laser is difficult because of the complexity of internal laser operation and because of the intensity of the radiation output involved. However, such modulation has been accomplished in order to initiate, control, and conclude laser action. In addition to simple modulation, there exist many applications for which a moving or deflected radiation beam is desirable. Such a need has been served in prior art low intensity devices with flying spot scanner tubes and the like. However the application of such tubes is quite limited because their light output is comparatively small and their response time is slow.

It is therefore an object of the present invention to provide a scanned or deflected beam of high radiation intensity and rapid response.

In accordance with the present invention, elongated reflection means extend along either side of a similarly elongated laser element. An elongated shutter means is extended between the radiation-producing laser element and one of the reflection means, and this shutter means is selectably operable along its length whereby only a portion of the reflection means is effective to reflect radiation back into the laser element. Stimulated coherent radiation occurs only where the shutter is opened for exposing the laser element to the reflection means.

In accordance with one embodiment of the present invention, the shutter includes a pair of spaced electrodes and these electrodes extend along the shutter means to form a transmission line. An input signal pulse applied to one end of the transmission line travels therealong acting to successively operate incremental portions of the laser. An intense laser beam output appears to travel from one end of the elongated laser element to the other as the pulse opens successive portions of the shutter.

Figure 2:
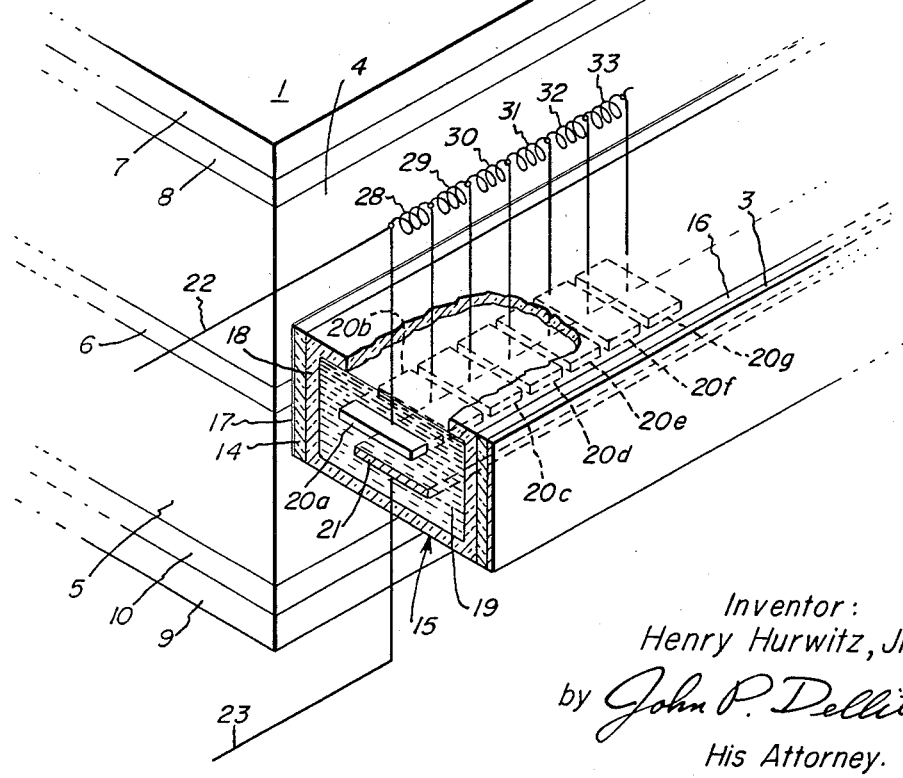

The subject matter which I regard as my invention is particularly pointed out and distinctly claimed in the concluding portion of this specification. The invention, however, both as to organization and method of operation, together wtih further objects and advantages thereof, may best be understood by reference to the following description taken in connection with the accompanying drawings wherein like reference characters refer to like elements and in which:

FIG. 1 is a perspective view of a first embodiment of a radiation scanning device in accordance with the present invention including shutter means illustrated partly in cross-section, and FIG. 2 is a perspective view of a second embodiment of a radiation scanning device in accordance with the present invention illustrated in greater detail and including shutter means also shown partly in cross-section.

Referring to FIG. 1, a laser radiation producing element 1 is disposed between first reflection means 2 and second reflection means 3, both reflective towards element 1. The laser element 1 is relatively flat vertically and is elongated horizontally with the reflection means 2 and 3 disposed adjacent the elongated side edges thereof. In this illustrated embodiment, the laser device may be of the semiconductor type disclosed and claimed in the copending application of Robert N. Hall, Ser. No. 232,846, filed Oct. 24, 1962, now Patent No. 3,245,002 issued Apr. 5, 1966 and assigned to the assignee of the present invention. In this type of device, element 1 has a degenerately impregnated P-type semiconductor region 4 and a degenerately impregnated N-type semiconductor region 5, these regions being separated by a narrow P-N junction region 6. A non-rectifying contact is made between the P-type region 4 and a first electrode 7 by means of an acceptor type or electrically neutral solder layer 8 and a non-rectifying connection made between the N-type region 5 and a second electrode 9 by means of a donor type or electrically neutral solder layer 10. Connectors 11 and 12 are secured to electrodes 7 and 9, respectively, as, for example, by welding or brazing, etc., and are connected at their remote ends to a source of electric current (not shown).

Specifically, the laser element substantially as illustrated in FIG. 1 may be made of a flat wafer cut from a monocrystalline ingot of N-type gallium arsenide which has been impregnated or doped with tellurium by growth from a melt of gallium arsenide containing at least $5 \times 10^{18}$ atoms per cubic centimeter of tellurium to cause it to be degenerately N-type. A P-N junction region is formed in a horizontal plane by diffusing zinc into all surfaces of the crystal at a temperature of approximately 1000° C. for approximately one-half hour using an evacuated sealed quartz tube containing the gallium arsenide crystal and 10 milligrams of zinc, thus producing a P-N junction region of approximately 1000 Angstroms in thickness at a distance of approximately 0.1 mm. below the surfaces of the crystal. The wafer is then cut and ground to remove all except one such planar junction.

As used herein the semiconductor body region is termed degenerate N-type when it contains a sufficient concentration of excess donor impurity carriers to raise the Fermi level thereof to a value of energy higher than the minimum energy of the conduction band on the energy band diagram of the semiconductor material. In a P-type semiconductor body or region, degeneracy means that a sufficient concentration of excess acceptor impurity carriers exists therein to depress the Fermi level to an energy lower than the maximum energy of the valence band on the energy band diagram. The Fermi level is that energy at which the probability of there being an electron present in a particular state is equal to one-half.

Reflecting means 2 and 3 are substantially parallel to one another and substantially perpendicular to P-N junction region 6, this being the region where laser emission takes place. This P-N junction region 6, and reflection means 2 and 3, form a cavity wherein a standing wave pattern of radiation may exist between the reflection means. Reflection means 2 may take the form of a separate metallized mirror, reflective toward element 1, or a highly polished surface of the semiconductor body. Similarly, reflection means 3 is a mirror having a highly polished metallized surface in the direction of the semiconductor body for the purpose of reflecting radiation. One of reflection means, 2 or 3, is desirably only partially reflecting whereby output radiation may pass through such reflection means. It is appreciated the size of the semiconductor laser device of FIG. 1 is quite small, on the order of millimeters in total length, and is shown here with proportions somewhat magnified for explanatory purposes.

Initially, theoretical laser operation will be considered without regard to the movement or scanning of the output beam according to the present invention. For operation of the laser element itself, a current is applied thereto between connectors 11 and 12 having a magnitude on the order of 5000 to 50,000 amperes per square centimeter. The current is applied in the forward polarity bias direction to establish "population inversion" of electrons at energy states in the semiconductor junction region. This inversion is a result of the bias as well as the degeneracy of the N and P-type semiconductor. Specifically, population inversion is believed to be caused by overlapping of a region of energy states filled with electrons in the N-type region, with region of empty energy states in the P-type region. Radiation-producing transitions are then believed to take place from the degenerate N-type region to the degenerate P-type region. These downward energy transitions of electrons cause an emission of radiation corresponding in frequency to at least the difference between the semiconductor energy bands. Such emission occurs principally at the thin junction region, and in any direction therefrom, but radiation taking place in a direction directly between reflection means 2 and 3 is reflected back and forth within the junction region. The reflection of such radiation stimulates further in-phase radiation, resulting in the building up of energy to a high value and the high output radiation characteristic of laser devices. Radiation from this semiconductor element is principally in the vicinity of from 7000 to 8500 Angstrom units. Lower current densities may be employed if the device is refrigerated to low temperatures.

The laser element employed in accordance with the present invention may be other than the semiconductor type. For example, laser element 1 may instead comprise a thin block of aluminum oxide, having a thickness about one one-thousandth its length, in which chromium oxide has been dispersed to the extent of a few hundredths to a few tenths of a percent by weight. The alumina crystal is normally colorless; the addition of chromium oxide, and hence of chromium ions $Cr^{3+}$, gives it color—faint pink to dark red—and it is commonly known as ruby. For laser use, about 0.05 percent by weight of chromium oxide is suitable. This laser element is provided input energy or pump energy using input radiation in the light or microwave frequency region impinging upon the upper and lower surfaces of the laser element 1. Such radiation, instead of an electric current as in the semiconductor case, produces a population inversion of $Cr^{3+}$ ions causing them to reside at a metastable state characterized by greater energy than such ions exhibit in the normally stable or ground state. After sufficient numbers of ions have been raised from the ground state and have subsequently attained the aforementioned metastable state to invert the normal population, they may produce spontaneous emission of radiation as these ions drop from the metastable state back to the ground state. If, on the other hand, an ion in the excited state is exposed to radiation of the same frequency as that which it might eventually emit spontaneously, there is a possibility it will be triggered or stimulated and emit its own quantum of radiation at once. This radiation when emitted is in phase with the stimulating radiation. Again, reflection means 2 and 3 provide a buildup of reflected radiation within a resonant cavity including reflection means 2 and 3 and laser element 1. The reflected radiation in this case comprises the triggering or stimulating radiation for causing the buildup of radiation in the laser element and the intense coherent laser output. Radiation is principally at a frequency of 6943 Angstrom units.

In accordance with an important feature of the present invention, the laser output radiation is scanned or deflected in order to achieve a positionable beam of intense radiation. Between the laser element and one of the reflecting means of the laser there is located an integral shutter means having longitudinally transformable operating characteristics. When this shutter is opened at a selected location with respect to the reflection means, it confines stimulated coherent radiation to a portion of the laser element aligned with the open shutter location. Only at this location is the reflected energy sufficient to exceed the level of stimulating radiation necessary to produce a characteristic laser output beam.

Referring again to FIG. 1, the shutter means, generally designated at 13, comprises, in this embodiment, an elongated radiation valve cell or light valve cell 15 disposed along the side edge of laser element 1 between the laser element 1 and one reflection means 3. The shutter means also includes a first polarizer 14 between element 1 and the radiation valve cell, and a second polarizer 16 between the radiation valve cell and reflection means 3. The first polarizer 14 is secured to the laser element 1 employing an adhering layer 17 (illustrated more clearly in FIG. 2) for producing a gradual dielectric constant change between the laser element and the polarizer so reflection at the interface between laser element and polarizer is minimized. Alternatively the interface between the polarizer and element 1 is disposed at an angle relative to radiation passing therethrough, that is, it is not parallel to reflection means 2 or 3.

The first polarizer 14 is oriented such that its plane of polarization for radiation passing therethrough is 90° from the plane of polarization of second polarizer 16. The plane of polarization of polarizer 14 conveniently makes an angle of 45° with the vertical in a first direction, while the plane of polarization of polarizer 16 is at the same angle on the opposite side of the vertical whereby it will have a polarization 90° from the first. Therefore no light will normally pass through both polarizers.

Radiation valve cell 15, here illustrated as a Kerr cell, suitably comprises an envelope 18 of radiation transparent material such as glass, with relatively flat sides disposed contiguously against polarizers 14 and 16. The glass envelope contains a body of liquid 19 exhibiting optical properties of a uniaxial crystal when subjected to an electric field. Nitrobenzene and nitrotoluene are suitable substances.

Inside the glass envelope 18 are two flat elongated electrodes 20 and 21. The electrodes lie in a horizontal plane with one above the other and substantially perpendicular to reflection means 2 and 3. These electrodes are relatively closely spaced but are disposed to allow passage of the laser beam therebetween. For example, they are spaced slightly farther apart than the thickness of junction layer 6, in the case of the semiconductor laser. In the case of a radiation pumped laser, the spacing of the electrodes should be about as great as the vertical width of reflection means 2 and 3, or the width of element 1 if the latter is narrower.

At one end of the elongated radiation valve cell 15, conductors 22 and 23 are connected to electrodes 20 and 21. These conductors connect the electrodes to a signal source 24. Signal source 24 is preferably a source of short well-defined pulses; however, source 24 may comprise a high frequency generator or other signal source providing a signal having high frequency sine wave components, such that electrodes 20 and 21 operate as a transmission line of finite length when coupled to the output of source 24. The crest portion of a moving sine wave may in some instances accomplish the purpose of a pulse. It is noted that a pulse is considered as having components which are quite high in frequency. The electrode structure 20-21 acts as a non-dispersive transmission line for the pulse components. Source 24 is preferably matched in impedance to the surge impedance of the transmission line comprising electrodes 20 and 21, and a matched load designated 25 at the remote end of the line also desirably matches this impedance. Therefore a pulse presented by source 24 will pass along the transmission line without reflection.

In operation in accordance with the present invention, an input signal, preferably a pulse of several kilovolts potential, and a duration on the order of microseconds or less, is applied across the end of electrodes 20 and 21 from signal source 24. At the same time, or just prior thereto, the laser device is pumped optically or electrically for causing a population inversion of energy states in the laser element 1. This pumping may be continuous. For instance, a large current is applied between connectors 9 and 10 as hereinbefore set out. A very large population inversion can be initially established in the absence of reflection of radiation between reflection means 2 and 3. Thus the normal population inversion threshold for coherent radiation is exceeded but laser emission does not result because the stimulating reflected radiation cannot pass back and forth through the element between reflection means 2 and 3 since shutter means 13 is closed. As the pulse provided from source 24 travels down the transmission line comprising electrodes 20 and 21, it acts to open the shutter 13 at a given point as the high voltage pulsation reaches such point. When high voltage exists across liquid 19, the radiation emanating from laser element 1, and plane polarized at polarizers 14, is then elliptically polarized by the liquid of the radiation valve cell. The liquid becomes doubly refracting under high voltage stress so that at least a portion of the plane polarized radiation from the first polarizer is rotated 90° allowing it to pass through the second polarizer. The opened shutter permits reflection from reflection means 3 and therefore triggers coherent radiation. A resultant intense light beam is produced between the two reflecting means 2 and 3 as the voltage pulse reaches each given point along the laser and each incremental region successively produces a burst of output radiation. The output beam thus appears to move as the voltage pulse moves. The moving beam of radiation is effective to pass through reflecting means 2 or 3, depending upon which of these is only partially reflecting.

A beam of relatively small instantaneous dimension is produced even though a relatively long pulse or one of indefinite trailing edge is generated at input source 24. Thus, the threshold of stimulated coherent radiation is readily adjusted so that only the wave front produces a burst of emission. Although pumping energy is supplied through the entire time cycle i.e. continuously, it is radiated for each portion of the laser element at the instant when that portion is triggered into operation by the opening of the corresponding portion of the shutter means.

Although the radiation beam produced has a given constant direction in the illustrated embodiment, it is readily appreciated such beam may be passed through an extended lens for deflecting the beam through an angle depending upon the point along the length of the laser element from which the radiation emanates. Moreover, the laser itself together with reflection and shutter means can take on a curvilinear configuration in the direction of elongation in order to achieve angular deflection. Angular deflection can also be achieved employing a mirror disposed in front of the laser output which mirror provides a continuously changing reflection angle along the length of the device. For example, a mirror in the form of a vertical cylinder may be positioned in front of reflection means 3 in which case reflection means 3 should be the reflection means which is only partially reflective. Another expedient as illustrated in FIG. 1, is a twisted ribbon-like mirror 26 disposed in front of laser output beam, 27, acting to direct the beam in a continuously changing angular direction as the beam traverses the length of the device. If the mirror is additionally constructed to take on a convex configuration towards the laser device, the scanned laser beam may be made to appear to originate from a single point source.

FIG. 2 illustrates a variation of the device in accordance with the present invention. In this embodiment, electrode 20 is divided or segmented into elements 20a through 20g, etc., and conductor 22 is connected to the first of these. Inductances 28 through 33 are connected between successive segments. These inductances together with capacitance between the segments of electrodes 20, and electrode 21, form a lumped-constant artificial transmission or delay line integral with the cell providing greater delay therealong to an input pulse or signal applied between conductors 22 and 23. The speed of deflection or movement of the output beam may thus be altered. The iterative nature of the structure facilitates the manufacture of an electrode including a large number of segments or delay line elements. If desired, additional capacitance can be connected between each segment of electrode 20 and electrode 21 in order to adjust the constants of the artificial transmission line, or the electrode segments may be extended, e.g., outside the cell, to increase their capacitance.

Although the illustrated embodiment demonstrates particular advantages and convenience in construction, various alterations are considered to be within the scope of the present invention in a broad sense. Other radiation valve cell means which are longitudinally controllable in accordance with the present invention can be employed between the laser element 1 and reflection means 3. Thus, instead of a Kerr cell, a Pockels cell including ammonium or potassium dihydrogen phosphate may be provided as the light transmitting element, with the controlling electric field being applied in a direction parallel to the direction of radiation output. In addition, Faraday rotation means employing a translatable magnetic field between polarizers may be used.

While I have shown and described several embodiments of my invention, it will be apparent to those skilled in the art that many other changes and modifications may be made without departing from my invention in its broader aspects; and I therefore intend the appended claims to cover all such changes and modifications as fall within the true spirit and scope of my invention.

What I claim as new and desire to secure by Letters Patent of the United States is:

1. A radiation scanning device adapted to deflect the radiation output of a laser including a laser element for emitting stimulated coherent radiation along a linear region thereof and having energy input means for producing a population inversion of energy states in said element and wherein said element is provided with reflection means disposed on either of two sides of said laser element acting to direct emitted radiation back through said element for stimulating coherent radiation, characterized in that said reflection means are extended along each side of said laser element in substantially facing relation to one another, and further including elongated shutter means substantially aligned with said linear region and extending between said laser element and one of said reflection means, and means for selectively operating said shutter means to pass radiation along a selectably restricted portion of the length of said shutter means so as to controllably confine stimulated coherent radiation of said laser element to the portion of said laser element substantially aligned with the restricted portion of said shutter means.

2. A radiation scanning device adapted to deflect the radiation output of a laser device including an elongated laser element for emitting stimulated coherent radiation along a linear region thereof and having energy input means for producing a population inversion of energy states in said element and wherein said element is provided with reflection means disposed on either of two sides of said laser element acting to direct emitted radiation back through said element for stimulating coherent radiation, characterized in that said reflection means extend for a length along each elongated side of said laser element in substantially facing relation to one another forming a laser cavity therewith, and further including elongated shutter means substantially aligned with said linear region and located between said laser element and one of said reflection means, said shutter means being selectively operable along the length thereof to pass radiation at a restricted portion of said length for controllably confining stimulated coherent radiation of said laser element to the portion of said laser element aligned with said restricted portion of said shutter means and including spaced control electrodes disposed along the length of said shutter means operable when energized to activate said shutter means, and input signal means connected across said control electrodes at one end of the length thereof providing an energization signal having high frequency components to operate said electrodes as a transmission line, said energization signal passing along said transmission line for selectively activating successive portions of said shutter means.

3. The device according to claim 2 wherein at least one of said control electrodes is separated along the length thereof into a plurality of small electrode segments, and further including a plurality of inductances coupled between said electrode segments for producing time delay therebetween.

4. A radiation scanning device adapted to position the emission output of a laser device including an elongated laser element for emitting stimulated coherent radiation along a linear region thereof and having energy input means for producing a population inversion of energy states in said element and wherein said element is provided with reflection means disposed on either of two sides of said laser element acting to direct emitted radiation back through said element for stimulating coherent radiation, characterized in that said reflection means extend for a length along each side of said laser element in substantially facing relation to one another, and including elongated shutter means located between said laser element and one of said reflection means so as to be in substantial alignment with said linear region along the length of said reflection means, said shutter means being selectively operable along the length thereof to pass radiation along a restricted portion of said length for controllably confining stimulated coherent radiation of said laser element to the portion of said laser element aligned with the restricted portion of said shutter means and including a first elongated polarizer element for passing radiation of a first angular polarization and a second elongated polarizer element aligned for passing radiation polarized at 90° with respect to said first polarizer element to normally prevent passage of radiation to said reflection means, said shutter means further including light rotating means situated between said polarizer elements for positionably altering the polarization of light between said polarizer elements along the length thereof.

5. The device according to claim 4 wherein said light rotating means comprises a radiation valve cell having flat spaced electrodes extending along the length of said shutter means substantially perpendicular to the direction of radiation and positioned on either side of the path of radiation for controllably producing rotation of radiation passing therebetween, said device further including means for energizing said electrodes.

6. A radiation scanning device comprising a laser element adapted to emit stimulated coherent radiation along a linear region thereof, said laser element having energy input means for producing a population inversion of energy states in said element and wherein said element is provided with reflection means on either side thereof acting to direct radiation back through said element for the purpose of stimulating coherent radiation, and shutter means located between said laser element and one of said reflection means in substantial alignment with said linear region, said shutter means being provided with electrical operating means selectably operable along the length thereof for opening said shutter means at predetermined locations along said reflection means in order to pass radiation between said laser element and restricted portions of said reflection means thereby confining stimulated coherent radiation of said laser element to the portions of said laser element which are aligned with selected open locations of said shutter means.

7. A radiation scanning device comprising a stimulated coherent emission semiconductor element including a crystalline body of semiconductor material, a first region within said body having N-type conductivity characteristics, a second region within said body having P-type conductivity characteristics, a third region of planar configuration located between and contiguous with said first and second regions having intermediate conductivity characteristics, substantially parallel reflection means on either side of said body located on either side of said third region being substantially perpendicular to said third region, at least one of said reflection means being partially reflecting, contact means making nonrectifying electrical contact with each of said first and second regions, means for applying a direct current to said body sufficient to bias the region between said first and second regions in the forward direction to cause a population inversion therebetween and emission of stimulated coherent radiation between said reflection means substantially in said third region, and shutter means located between said third region of said body and one of said reflection means, said shutter means extending along said third region in substantial alignment therewith and being selectively operable therealong for controllably confining stimulated coherent radiation to a restricted portion of said third region aligned with the operating portion of said shutter means.

8. The radiation scanning device of claim 7 wherein said shutter means comprises a plurality of spaced elongated operating electrodes disposed along said third region between said third region and said one of said reflection means, said shutter means being operable when energized to permit passage of radiation between said third region and a portion of said reflecting means, and means producing an energization signal connected between said electrodes at first ends thereof, said energization signal including signal components of sufficiently high frequency so that said electrodes act as a transmission line for operating said shutter means to pass radiation between said third region and said one of said reflection means as portions of said electrodes are activated by passage of said energization signal along said transmission line.

9. A radiation scanning device adapted to deflect the radiation output of a laser device and comprising a laser element for emitting stimulated coherent radiation along a linear region thereof, said element having energy input means for providing a population inversion of energy states in said element and being provided with reflection means disposed on either side of said laser element for directing emitted radiation back through said element, said energy input means providing energy at least sufficient for normally triggering stimulated coherent radiation from said element, a normally closed elongated shutter means in substantial alignment with said linear region and extending between said laser element and one of said reflection means, said elongated shutter means including a radiation valve cell provided with elongated spaced electrodes extending along said laser element and effective to operate said radiation valve cell as a predetermined voltage is provided between said electrodes, and means for coupling first ends of said elongated electrodes to a source of input signal of said predetermined voltage, said signal propagating along said elongated electrodes as a transmission line to progressively operate said radiation valve cell and thereby progressively open said shutter means momentarily so that stimulated coherent radiation is progressively produced along said laser element.

10. Shutter means for selectively transmitting radiation comprising radiation valve cell means encased in a transparent enclosure and including first and second elongated electrodes contained within said enclosure for operating said valve cell means, said elongated electrodes facing one another in spaced relationship forming a transmission line, and means for coupling adjacent first ends of said electrodes to a source providing a signal for propagation along said transmission line whereby said signal progressively operates said valve cell means as said signal propagates along said transmission line to progressively and continuously open incremental portions of said shutter means.

11. Shutter means for selectively transmitting radiation comprising radiation valve cell means encased in a transparent enclosure and including first and second elongated electrodes, said elongated electrodes facing one another in spaced relation within said enclosure end forming a transmission line in their elongated direction, means for providing a signal to adjacent first ends of said electrodes, a substance having the property of effecting rotation of polarized radiation when subjected to electrical stress disposed in said radiation valve cell between said electrodes, and polarizing means located on either side of said radiation valve cell for intercepting radiation, said polarizing means being normally aligned to prevent passage of radiation therebetween except when passage of said signal along said transmission line progressively produces electrical stress so as to rotate polarized radiation in said substance along said line to progressively and continuously open incremental portions of said shutter means.

References Cited

UNITED STATES PATENTS

| | | | |
|---|---|---|---|
| 2,666,363 | 1/1954 | Beams et al. | 350—150 |
| 2,928,317 | 3/1960 | Haines | 350—150 |
| 3,295,911 | 1/1967 | Ashkin et al. | 350—150 |

FOREIGN PATENTS 608,711  3/1962  Belgium.

JEWELL H. PEDERSEN, *Primary Examiner.*

R. L. WIBERT, *Assistant Examiner.*